April 5, 1955     D. GIACOSA     2,705,660
MOTOR VEHICLE FRAME STRUCTURE
Filed July 31, 1951     5 Sheets-Sheet 1
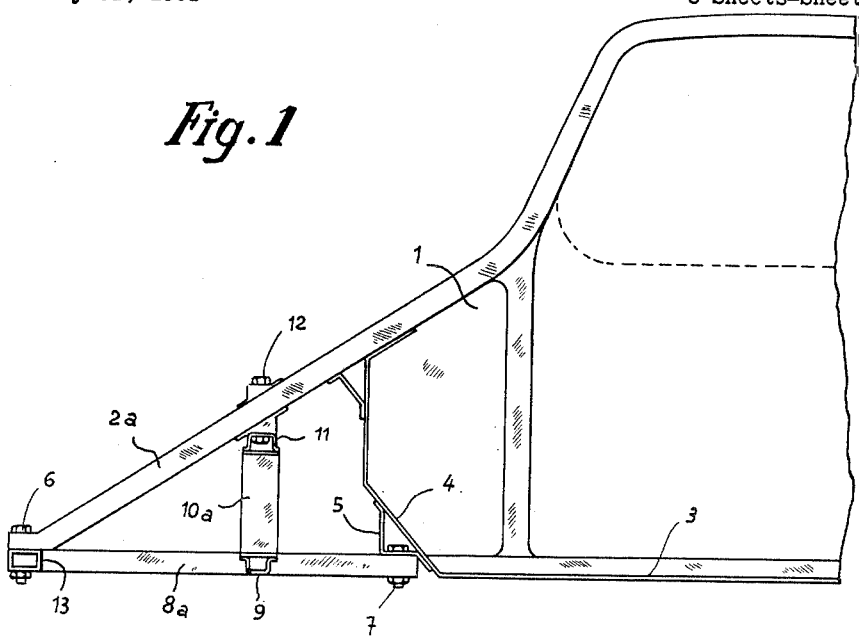
Fig. 1
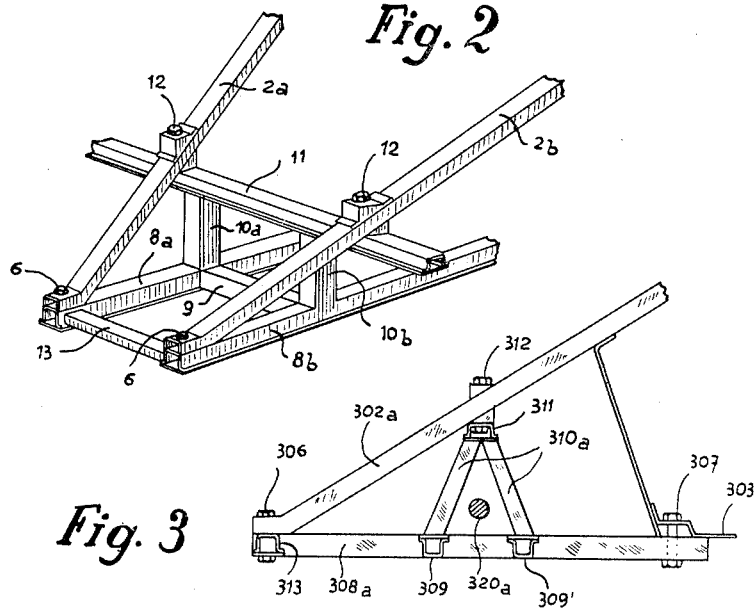
Fig. 2
Fig. 3
Inventor
Dante Giacosa
By Robert E. Burns
Attorney April 5, 1955  D. GIACOSA  2,705,660
MOTOR VEHICLE FRAME STRUCTURE
Filed July 31, 1951  5 Sheets-Sheet 2

Inventor
Dante Giacosa
By Robert E Burns
Attorney

Inventor
Dante Giacosa
By Robert E. Burns
Attorney

Inventor
Dante Giacosa
By Robert E. Burns
Attorney

April 5, 1955 D. GIACOSA 2,705,660
MOTOR VEHICLE FRAME STRUCTURE
Filed July 31, 1951 5 Sheets-Sheet 5

Inventor
Dante Giacosa
By Robert E Burns
Attorney

United States Patent Office 2,705,660
Patented Apr. 5, 1955

2,705,660

MOTOR VEHICLE FRAME STRUCTURE

Dante Giacosa, Turin, Italy, assignor to Fiat S. p. A., Turin, Italy

Application July 31, 1951, Serial No. 239,422

Claims priority, application Italy August 4, 1950

7 Claims. (Cl. 296—28)

This invention relates to motor vehicles of the chassisless type, more particularly to the structure of the front vehicle portion and its connection with the remaining part of the vehicle body.

The main object of this invention is to provide in a vehicle of the chassisless type a rigid front structure secured to the coachwork body by the smallest possible number of screws, bolts etc., consequently easily assemblable and disassemblable.

According to this invention a chassisless vehicle comprising a coachwork body having a front portion and a bottom, having two arms extending forwardly and inclined downwardly, is provided with a rigid structure comprising a pair of longitudinal members detachably connected in front to the ends of said arms and at the rear substantially to the bottom of the coachwork body, a U-shaped structure having a cross member connecting together the intermediate portions of said two longitudinal members and two standards extending between a longitudinal member and its arm, and means for detachably securing the upper ends of said standards to said arms.

This arrangement may be further reinforced or stiffened according to requirements by means of additional cross members more particularly, one of said additional cross members may connect the fore ends of arms of the chassisless vehicle or of the longitudinal members.

The abovementioned rigid structure comprising the longitudinal members and U-shaped structure may be advantageously combined with a resilient independent wheel suspension of the articulated parallelogram type, one side of which consists of the wheel spindle, while the opposite side is formed by the respective upright member or pillar of the U-shaped structure, and the two remaining sides opposite each other are in the form of links articulated to said spindle and substantially to the base and top of said pillar.

The invention will be better understood from the appended specification referring to the accompanying drawings which show by way of example some constructions thereof. On the drawings:

Figure 1 is a section on a longitudinal vertical plane of the front portion of a chassisless vehicle according to this invention;

Figure 2 is a perspective view of a portion of Figure 1;

Figure 3 is a section similar to Figure 1 of a modification;

Figure 4:
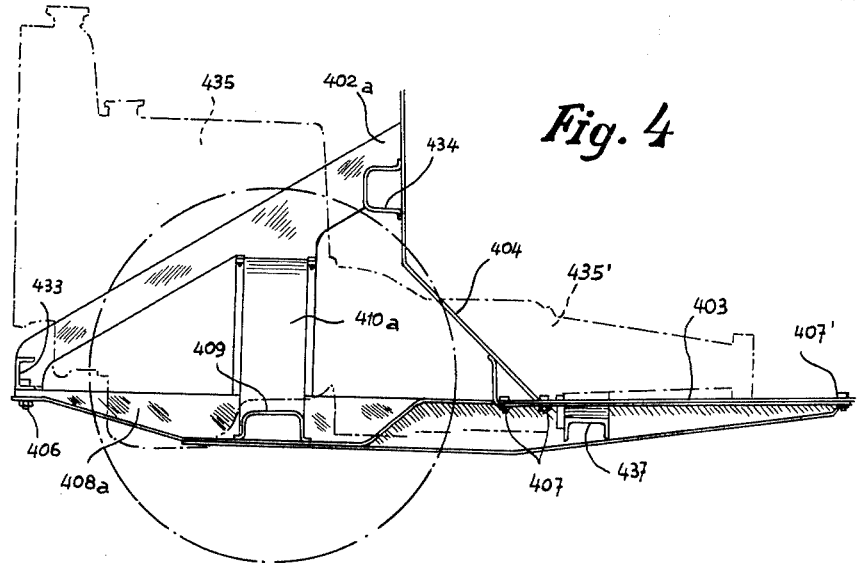
Figures 4, 5 and 6 are a longitudinal vertical section, a plan view and a front view, respectively, of a construction.
Figure 5:
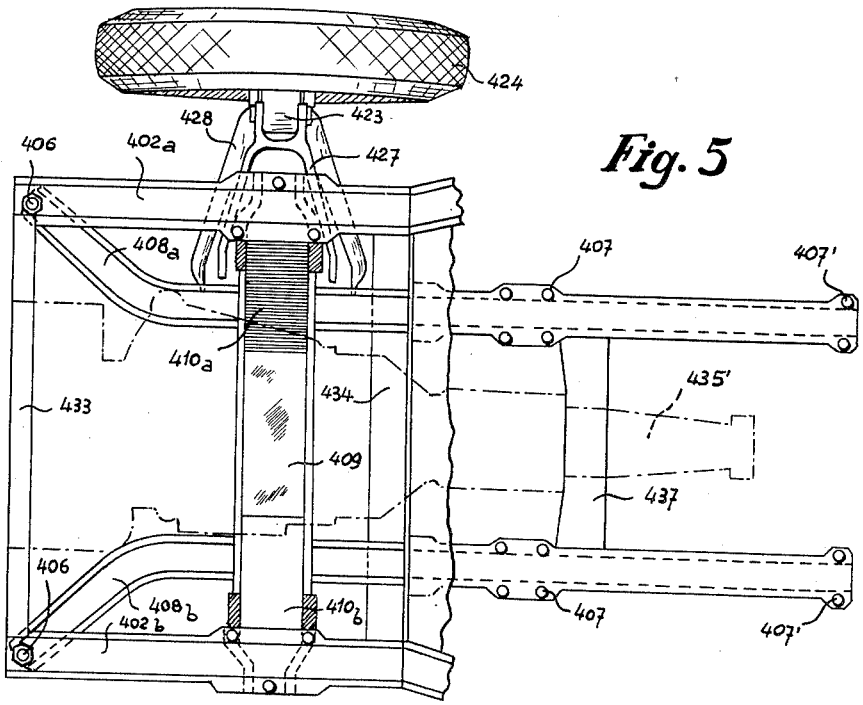
Figure 6:
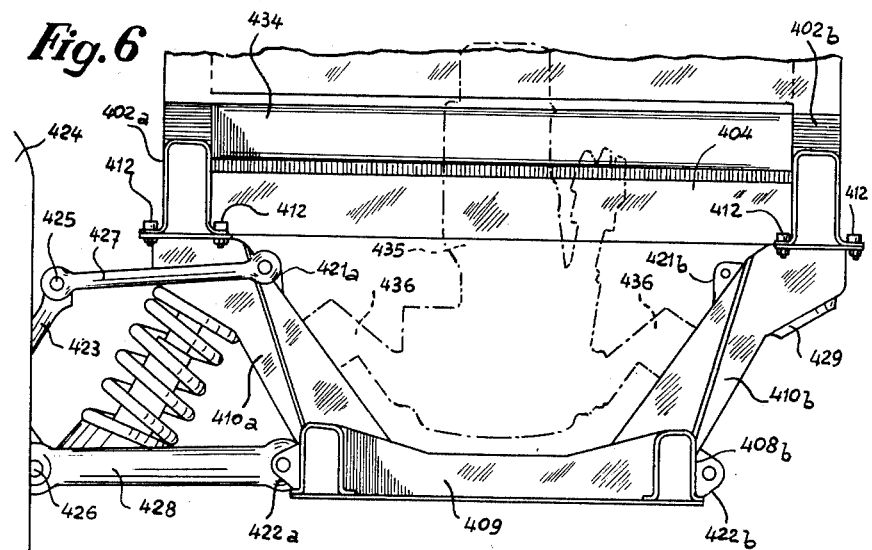
Figure 7:
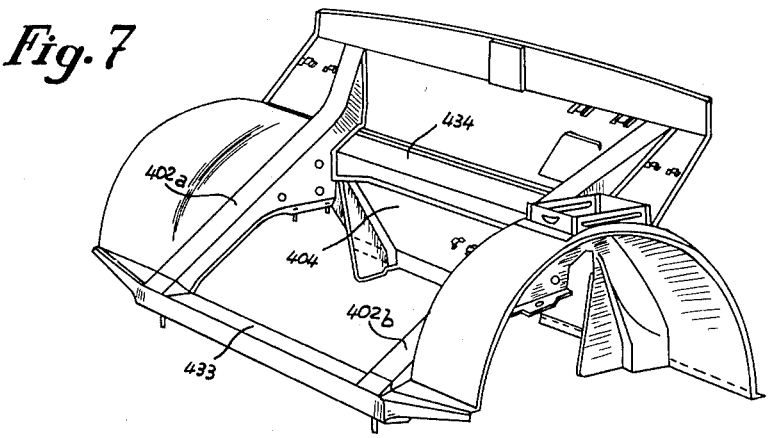
Figure 8:
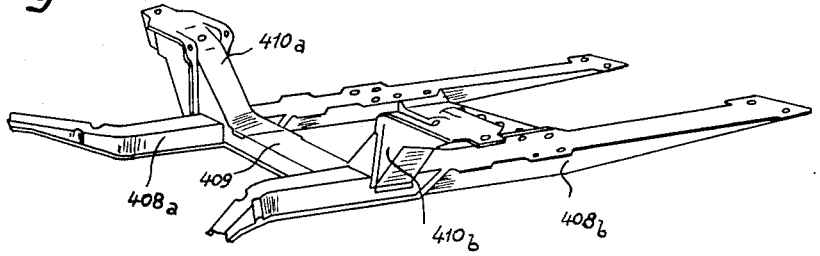
Figure 9:
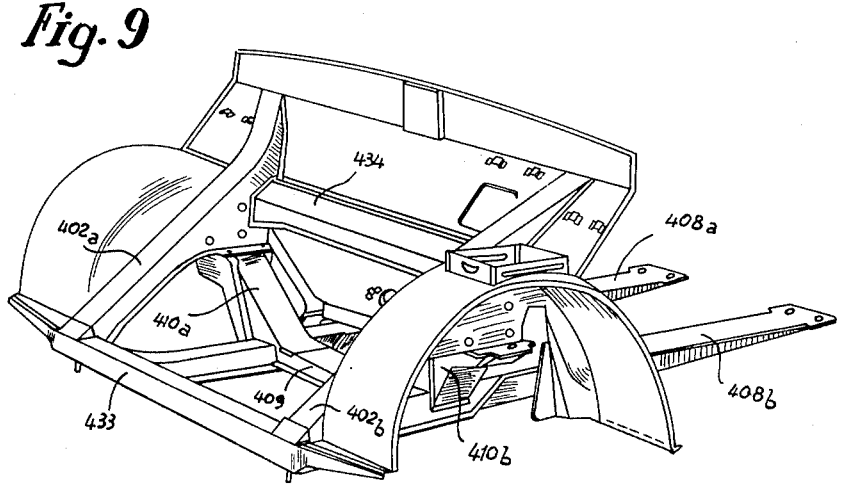

Figures 7 and 8 show the front portion of the chassisless vehicle and structure according to figures 4, 5 and 6 in perspective view, before assembly;

Figure 9 shows the same parts after assembly.

Figure 12:
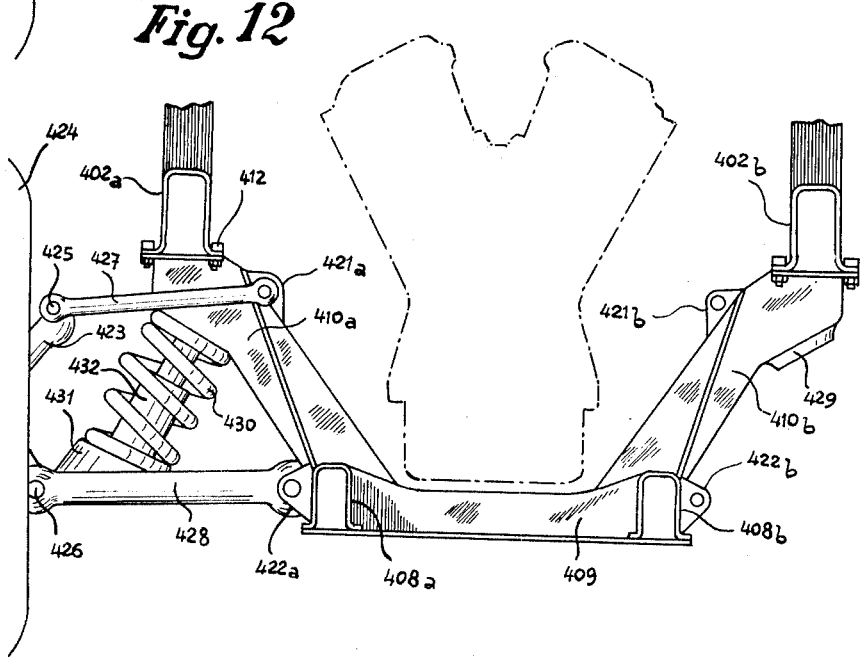
Figure 10:
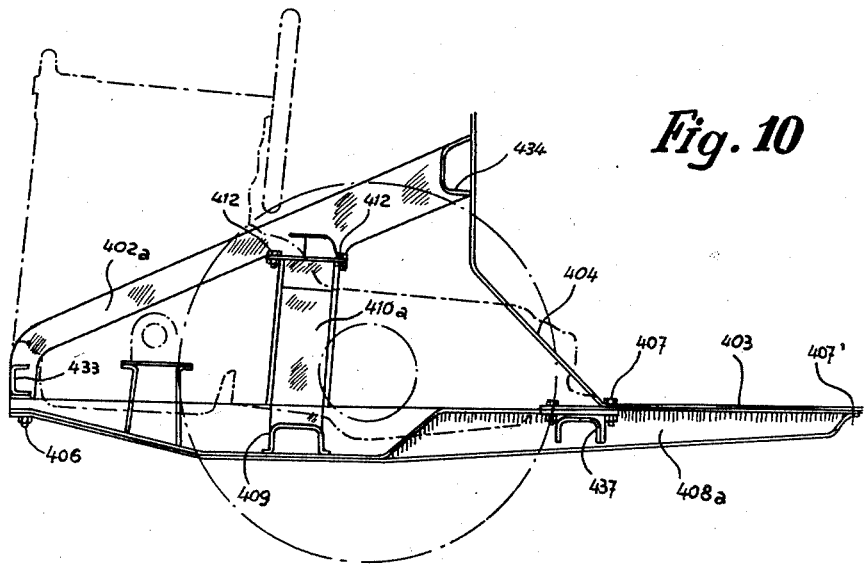
Figure 11:
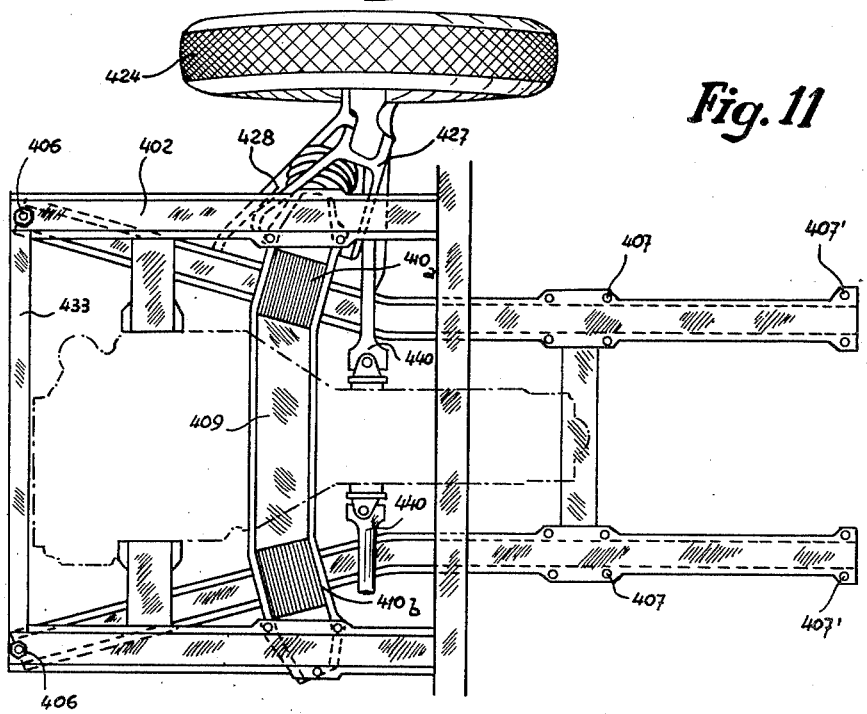

Figures 10, 11, 12 are a longitudinal vertical section, a plan view and a front view, respectively, of a modification of Figures 4, 5 and 6.

Referring to Figures 1 and 2, 1 denotes the front portion of the chassisless vehicle comprising a coachwork body have a front portion and a bottom, having two arms 2a, 2b (Figure 1 shows the right-hand arm only) extending towards the fore portion of the vehicle, that is, towards the left of the figure, and inclined downwardly. 3 denotes the bottom of the coachwork, of which a wall 4 is substantially an extension.

A rigid structure is secured to the ends of the arms 2a, 2b and a support 5 fast with the wall 4 by means of bolts 6, 7, respectively and comprises two longitudinal members 8a, 8b and a U-shaped structure formed by a cross member 9 connecting together the intermediate portions of said longitudinal members and two pillars 10a, 10b extending upwardly from their respective longitudinal members 8a, 8b. The upper ends of said pillars are welded to a cross member 11 connected with the arms 2a, 2b by means of bolts 12. For the purpose of an improved stiffening of the structure, the fore ends of the longitudinal members 8a, 8b are connected together by means of a cross member 13. As will be seen in Figures 1 and 2, the whole rigid structure just described is connected with the remainder of the coachwork by means of six bolts only and is therefore easily assembled and disassembled. The elements forming the structure are preferably connected together by welding.

According to Figure 3, the rigid structure comprises, as in the previous case, two longitudinal members 308a and 308b connected by means of bolts 306 and 307 to the arms 302a, 302b and to the bottom 303 of the coachwork body (in the figure the elements of the right-hand side only are visible and are provided with an index "a"). In this case, however, the U-shaped structure comprises two cross members 309, 309' connecting the longitudinal members 308a, 308b and two side pillars 310a, 310b, each of said pillars being in the form of an inverted V supported by its respective longitudinal member at the cross members 309, 309'. The apexes of said pillars are welded, as in the previously described construction, to a cross member 311 connected with the arms 302a and 302b by means of bolts 312. 313 denotes a supplementary cross member, similar to the cross member 13 of Figure 1. The arrangement according to Figure 3 is particularly convenient in case the structure just described has articulated thereto the spindles of the driving wheels and transverse passages between the driving stub axles are required. In fact, as will be seen from Figure 3, a driving stub axle 320a may easily extend between the two branches of the inverted V-pillar 310a.

The elements forming the rigid structure should not necessarily be perpendicular or substantially perpendicular to each other, as would appear from the previous figures. The particular shape of the individual component parts depends upon many factors, including, for example, overall size of the engine, type of wheel suspension or, upon, whether the wheels are driving wheels or not.

In Figures 4 to 9 the arms 402a and 402b are substantially parallel to each other, and still inclined forwardly and downwardly. The longitudinal members 408a, 408b converge towards each other from their points of attachment 406 (Figure 5) over a certain length, whereafter they extend parallel with each other to the points 407, 407' at which they are connected to the bottom 403 of the coachwork. The U-shaped structure is arranged at the converging portions of the longitudinal members and comprises a cross member 409 and two side pillars 410a and 410b which diverge above from each other for direct connection to their respective arms 402a, 402b by means of bolts 412. As in the previous cases, the longitudinal members, cross member and pillars are welded together to a rigid unit.

Each pillar 410a, 410b is provided at the top with supports 421a, 412b. Similar supports 422a, 422b are provided on the sides of the longitudinal members 408a, 408b. The supports 421 are turned towards the inside of the portal while the supports 422 are turned outwardly. The spindle 423 of a wheel 424 is articulated at 425 and 426 to two swing arms 427, 428, respectively, of which the upper one 427 is articulated in turn to the support 421a and the lower one 428 is articulated to the support 422a.

The pillars 410a, 410b of the U-shaped structure are provided at the top with circular seats 429 for receiving the helical suspension springs 430 resting at their lower end on further seats 431 formed in the lower swing arms 428. Each spring 430 encloses a telescopic shock absorber 432 anchored at its lower end to the arm 428 and at its upper end to the upper portion of the pillar 410a or 410b (Figure 6). As will be seen from Figure 5, the swing arms 427, 428 are in the form of forks. More particularly, the upper fork 427 encircles the upper portion of the pillar 410a, 410b, respectively. Although Figures 5 and 6 show in detail the right-hand portion of the vehicle only, it will be understood that the details of the lefthand side are symmetrical therewith.

In order to further stiffen the vehicle, supplementary cross members are provided such as the cross member 433 which connects the ends of the arms 402a, 402b, or a cross member 434 which connects at the top said arms and further serves for fixing and stiffening the front wall 404 of the coachwork body.

The engine unit 435 of the motor vehicle may rest by means of two lugs 436 against the inner sides of the pillars 410a, 410b, while its rear portion 435' is supported by a cross member 437 connecting together at a suitable point the two longitudinal members 408a, 408b.

In Figures 10, 11 and 12 the same reference numerals as in Figures 4 to 9 have been adopted for the sake of simplicity. In this case, however, the wheels 424' are directly driven by the engine unit 435 through the stub axles 440, this drive being made possible by deflecting the pillars 410a, 410b of the U-shaped structure at the top behind the vertical plane extending through the cross member 409 while, as will easily be ascertained, in Figures 4 to 9 the pillars and cross member are arranged substantially in a common vertical plane (Figures 4 and 5) perpendicular to the longitudinal vehicle axis.

It will easily be ascertained from the figures described above that the invention provides a front vehicle structure which is tough and simple in construction and is secured to the coachwork body by means of a limited number of bolts (6, 7; 306, 307; 406, 407, 407'), so that assembly and disassembly are much easier and quicker than in prior constructions.

I wish it to be understood that the shape of the individual component parts of the rigid structure, comprising the U-shaped structure resting on two longitudinal members, may vary according to requirements without departing from the scope of the appended claims.

What I claim is:

1. In combination with a chassisless vehicle comprising a coachwork body having a front portion and a bottom, and a pair of arms inclined downwardly from said front portion and extending forwardly of said bottom, of a rigid structure adapted to support the engine unit and front suspension of the motor vehicle, comprising a pair of longitudinal members detachably connected at the front to the forward ends of said arms and at the rear to said bottom, a cross member permanently connecting together the front ends of said longitudinal members, a U-shaped structure having a cross member connecting together the intermediate portions of said two longitudinal members and two pillars extending respectively between said longitudinal members and their respective arms, and means for detachably securing the upper ends of said pillars to said arms.

2. In combination with a chassisless vehicle comprising a coachwork body having a front portion and a bottom, and a pair of arms inclined downwardly from said front portion and extending forwardly of said bottom, of a rigid structure adapted to support the engine unit and front suspension of the motor vehicle comprising a pair of longitudinal members detachably connected at the front to the ends of said arms and at the rear to the coachwork bottom, a U-shaped structure having a cross member connecting together the intermediate portions of said pair of longitudinal members and two side pillars extending upwardly from said longitudinal members, a cross member connecting together the upper ends of said pillars and means for detachably securing said cross member to said arms of the chassisless vehicle.

3. In combination with a chassisless vehicle comprising a coachwork body having a front portion and a bottom, and a pair of arms inclined downwardly from said front portion and extending forwardly of said bottom, of a rigid structure adapted to support the engine unit and front suspension of the motor vehicle, comprising a pair of longitudinal members detachably connected at the front to the forward ends of said arms and at the rear to said bottom, a front cross member permanently connecting the front ends of said longitudinal members, a U-shaped structure consisting of two parallel cross members connecting the intermediate portions of said longitudinal members and two side pillars, each in the form of an inverted V supported at its lower end by its respective longitudinal member at said two cross members, and means for detachably securing the apexes of said pillars to said arms.

4. In combination with a chassisless vehicle comprising a coachwork body having a front portion and a bottom, and a pair of arms inclined downwardly from said front portion and extending forwardly of said bottom, of a rigid structure adapted to support the engine unit and front suspension of the motor vehicle, comprising a pair of longitudinal members detachably connected at the front to the forward ends of said arms and at the rear to said bottom, a U-shaped structure having a cross member connecting together the intermediate portions of said two longitudinal members and two pillars extending upwardly from said longitudinal members, a cross member connecting together the upper ends of said pillars, and means for detachably securing said cross member to said arms of the chassisless vehicle.

5. In combination with a chassisless vehicle comprising a coachwork body having a front portion and a bottom, and a pair of arms inclined downwardly from said front portion and extending forwardly of said bottom, of a rigid structure adapted to support the engine unit and front suspension of the motor vehicle, comprising a pair of longitudinal members detachably connected in front to the forward ends of said arms and at the rear to said bottom, a U-shaped structure having a cross member connecting together the intermediate portions of said two longitudinal members and two side pillars extending upwardly from said longitudinal members, a cross member connecting together the upper ends of said pillars, and means for detachably connecting the upper ends of said pillars with said arms of the chassisless vehicle.

6. A structure as claimed in claim 5 in which said pillars and cross member are located in the same vertical plane perpendicular to the longitudinal axis of the vehicle.

7. A structure as claimed in claim 5, in which said pillars are deflected at the top from the vertical plane of said cross member for the purposes specified.

References Cited in the file of this patent

UNITED STATES PATENTS

| | | |
|---|---|---|
| 2,122,476 | Leighton | July 5, 1938 |
| 2,123,087 | Leighton | July 5, 1938 |
| 2,139,750 | Hicks | Dec. 13, 1938 |
| 2,228,107 | Best | Jan. 7, 1941 |
| 2,248,319 | Waterhouse, Jr. | July 8, 1941 |
| 2,389,907 | Helmuth | Nov. 27, 1945 |

FOREIGN PATENTS

| | | |
|---|---|---|
| 940,982 | France | June 21, 1948 |